Feb. 12, 1963 F. L. HAUSHALTER 3,077,090
COMPOSITE ASSEMBLY FOR USE BETWEEN CONCENTRIC
SECTIONS OF A TORSIONAL SHAFT
Original Filed Aug. 18, 1960
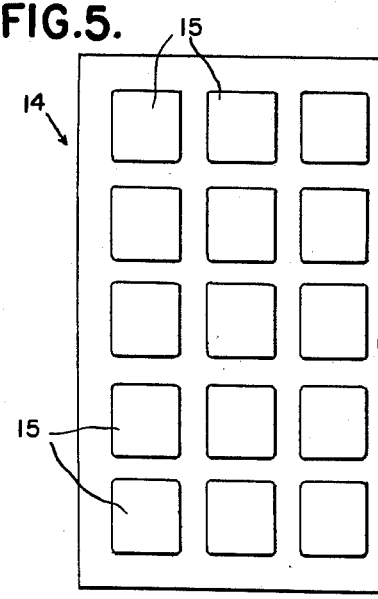
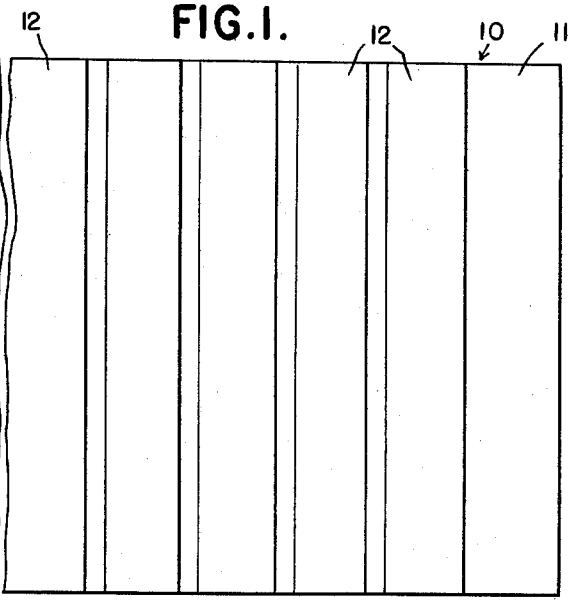
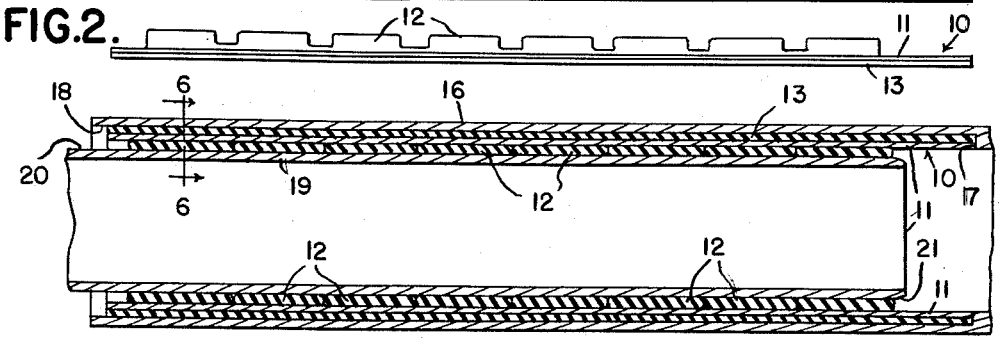
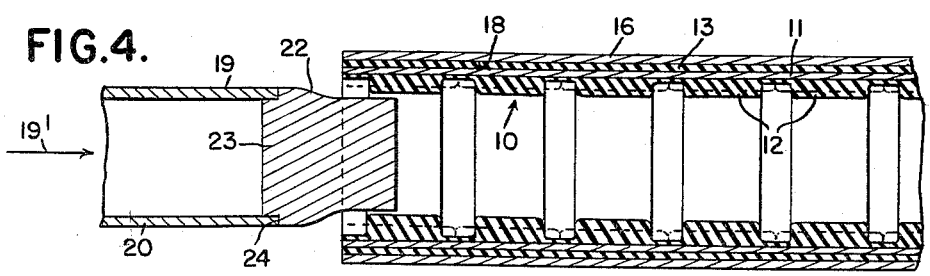
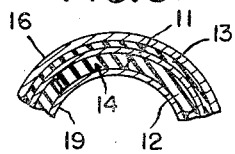
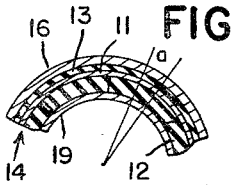
INVENTOR.
FRED L. HAUSHALTER
BY
ATTORNEYS United States Patent Office 3,077,090
Patented Feb. 12, 1963

3,077,090
COMPOSITE ASSEMBLY FOR USE BETWEEN CONCENTRIC SECTIONS OF A TORSIONAL SHAFT
Fred L. Haushalter, 2185 Scott Lake Road, Pontiac, Mich.
Original application Aug. 18, 1960, Ser. No. 50,448. Divided and this application May 25, 1962, Ser. No. 197,750
12 Claims. (Cl. 64—27)

This invention relates generally to a composite assembly for use between concentric sections of a torsional shaft, and refers more particularly to a composite assembly disposed within the annular space between the opposed concentric cylindrical surfaces of the spaced apart relatively rotatable, inner and outer members or sections of a torsional shaft.

This application constitutes a division of my application Serial No. 50,448, filed August 18, 1960.

One of the essential objects of the invention is to provide a composite assembly for use between the relatively rotatable members of a torsional shaft wherein the composite assembly is preformed before being assembled with the members.

Another object is to provide a composite assembly so formed that it may be quickly and easily assembled with the relatively rotatable members.

Another object is to provide a composite assembly which includes a metal sheet or strip having a plurality of slabs or one or more strips of elastic material bonded to one surface thereof and a relatively thin coating of elastic material bonded to the opposite surface thereof.

Another object is to provide a composite assembly which serves as the sole means for effecting a yieldable connection between the relatively rotatable inner and outer members.

Another object is to provide a composite assembly wherein the slabs or strips are relatively thick and capable of substantial radial compression, and wherein the coating of elastic material substantially completely covers the surface of the sheet or strip to which it is bonded.

Another object is to provide a composite assembly wherein the slabs are spaced apart circumferentially in a row and have a substantially constant torsion rate throughout a specified angle so that relative rotation of the members is substantially proportional to the torque applied, and wherein the slabs are so spaced as to close up when the specified angle is exceeded to substantially increase the torsion rate.

Another object is to provide a composite assembly having a plurality of axially spaced, circumferentially extending rows of circumferentially spaced individual slabs of elastic material bonded permanently in surface-to-surface relation to one surface of the metal sheet or strip.

Another object is to provide a composite assembly having a plurality of axially spaced circumferentially extending continuous strips of elastic material bonded permanently in surface-to-surface relation to one surface of the metal sheet or strip.

Other objects and features of the invention will become apparent as the description proceeds, especially when taken in conjunction with the accompanying drawings, wherein:

FIGURE 1 is a fragmentary plan view of the initial form of a composite assembly or insert, before assembly with the sections or members of a torsional shaft.

FIGURE 2 is an edge view of the inert shown in FIGURE 1.

FIGURE 3 is a longitudinal sectional view of a torsional shaft having the insert of FIGURES 1 and 2 disposed in the space between the shaft sections.

FIGURE 4 is a view similar to FIGURE 3 but shows the parts in an intermediate stage of assembly.

FIGURE 5 is a fragmentary plan view of a modified insert.

FIGURE 6 is a fragmentary sectional view, taken on the line 6—6 of FIGURE 3, of a torsional shaft having a slab type insert.

FIGURE 7 is similar to FIGURE 6 but shows the inner and outer sections of the torsional shaft relatively rotated.

In FIGURES 1 and 2 it will be seen that the composite assembly or insert 10 initially comprises a flat rectangular metal sheet 11, preferably steel, to one side of which are bonded a plurality of spaced, parallel shaped resilient elements or strips 12 formed from rubber or other curable elastomer. These elements are securely bonded to the metal sheet by curing the elements to the sheet. By bonding the rubber to a thin flat steel sheet, the pressure of vulcanization is at right angles to the plane of the metal, or directly down on the metal, so that a good bond is obtained. A relatively thin coating 13 of elastic material such as rubber is bonded to the opposite surface of the sheet 11. The coating 13 may be sprayed on, or it may be a sheet of rubber bonded to the metal by curing directly thereto. The coating covers the entire surface of the metal sheet so that its edges are flush with the edges of the sheet.

In FIGURE 5, an insert 14 is shown which differs from insert 10 only in that instead of the spaced parallel strips of rubber, spaced parallel rows of spaced individual slabs 15 are bonded to the flat metal sheet. The opposite surface is provided with a coating like the coating 13 for insert 10.

With respect to both inserts 10 and 14, there will be a thin film of rubber over the metal between the elements 12 or 15. However, this is incidental and is the result of flow from the elements during curing.

After the rubber strips or slabs and coating have been bonded to the flat metal sheet, the combined rubber and metal insert is bent to circular form with the rubber elements on the inside of the circle, and inserted into the outer member or tube 16 against shoulder 17. With respect to insert 10, the strips will extend circumferentially in axially spaced relation to each other, and with respect to insert 14, the rows of slabs will extend circumferentially and in axially spaced relation to each other, and the slabs in each row will be spaced circumferentially from each other. The insert 10 is shown in FIGURES 3 and 4, although the insert 14 will have the same appearance in longitudinal section and is inserted in the same way. The inner member or tube 19 is then inserted axially within the outer tube and insert in the direction of the arrow 19' to the final assembled position of FIGURE 3. In the final assembled position, the outer cylindrical surface 20 of the inner tube and the inner surface 18 of the outer tube are concentric and define an annular space which is of less radial width than the combined cross-sectional thickness of the rubber elements, metal sheet and coating making up the insert 10 or 14. Accordingly, the wall of the rubber elements 12 or 15 will be compressed about 40% to 50% of their original height of section when the assembly is completed, and the rubber elements will frictionally engage the cylindrical outer surface 20 of the inner tube 19. The rubber coating 13 frictionally engages the cylindrical inner surface 18 of the outer tube and may, as stated, be very thin since the primary purpose is to prevent slip.

The inner tube may have an annular bevel 21 at one end to facilitate insertion, or as an alternative, a tapered pilot 22 may be employed for this purpose. The pilot 22 has a reduced end 23 adapted to enter the inner tube which defines a shoulder 24 engageable with the tube end. The pilot is removed after assembly. FIGURE 4 shows the rubber elements in solid lines before insertion of the inner tube, and in dotted lines after insertion thereof.

Since the radial width of the space between the tubes is less than the thickness of the insert, the rubber elements 12 or 15, which are initially placed in radial compression when the insert is bent to circular form, will be stretched a substantial amount and placed under tension as the inner tube is inserted. At the same time the rubber elements tend to assume their original form and therefore they will be further compressed. The tendency of the rubber elements to assume their original form effects an intimate frictional engagement between the rubber elements 12 or 15 and the inner tube, and between the coating 13 and the outer tube.

The tubes 16 and 19 are concentric sections of a torsional shaft, such as the propeller shaft of a motor vehicle.

When the insert 10 having continuous rubber strips is employed, the torsional rate in inch-pounds per degree is substantially constant; that is, the relative rotation between the members 16 and 19 is nearly proportional to the torque, so that a plot of angle against torque would produce substantially a straight line. However, if the insert 14 having rows of spaced slabs is used and the slabs are properly spaced circumferentially, when the members 16 and 19 are rotated relatively the torsional rate will be fairly constant through a specified angle and then the rubber will stiffen up and the torsion rate will increase substantially as the gap between the slabs closes.

Referring to FIGURE 6, the inner and outer members are shown with no torque applied, and the insert is of the type in which the rubber elements are in the form of spaced slabs. With no torque applied, the slabs barely touch. When the inner and outer members are relatively rotated, the torsion rate is initially constant so that torque is proportional to the angle, but when a specified angle "a" is reached, the gap between the slabs closes, as in FIGURE 7; and the torsional rate thereafter increases markedly due to the fact that the rubber stiffens and acts much like a continuous strip.

While the bonding of the rubber elements to the metal strip has been described as being effected by curing the rubber to the metal, the rubber may be adhered to the metal by other suitable methods such as by adhesives. The preferred initial step is one in which the rubber elements are bonded to a flat metal strip which is subsequently bent to circular form; but it is within the concept of the invention to bond the rubber to a preferred continuous metal band. Other modifications within the terms of the claims are also contemplated. It will also be understood that in each of the modifications described, the rubber elements may be lubricated to facilitate the entry of the inner member during assembly.

What I claim as my invention is:

1. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin, substantially annular metal sheet within said annular space between and concentric with said cylindrical surfaces, a circumferentially extending row of circumferentially spaced individual slabs of elastic material bonded permanently in surface-to-surface relation to one of the radially facing surfaces of said sheet and disposed in surface-to-surface frictional engagement with the cylindrical surface of one of said rotatable members, and friction material bonded permanently in surface-to-surface relation to and substantially completely covering the other of the radially facing surfaces of said sheet and disposed in surface-to-surface frictional engagement with the cylindrical surface of the other of said rotatable members, the radial width of the annular space aforesaid being less than the initial combined overall cross-sectional thickness of said sheet and the material bonded to opposite surfaces thereof in the free state of said material, whereby said entire insert is under compression between said cylindrical surfaces.

2. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin, substantially annular metal sheet within said annular space between and concentric with said cylindrical surfaces, a circumferentially extending row of circumferentially spaced individual slabs of elastic material bonded permanently in surface-to-surface relation to one of the radially facing surfaces of said sheet and disposed in surface-to-surface frictional engagement with the cylindrical surface of one of said rotatable members, and friction material bonded permanently in surface-to-surface relation to the other of the radially facing surfaces of said sheet and disposed in surface-to-surface frictional engagement with the cylindrical surface of the other of said rotatable members, said slabs being relatively thick and capable of substantial radial compression and said friction material being relatively thin in comparison with said slabs, the radial width of the annular space aforesaid being less than the initial combined overall cross-sectional thickness of said sheet and the material bonded to opposite surfaces thereof in the free state of said material, whereby said entire insert is under compression between said cylindrical surfaces.

3. The combination defined in claim 2, wherein said friction material is a layer of elastic which substantially completely covers the surface of said sheet to which it is bonded.

4. The combination defined in claim 3, wherein said slabs are bonded to the radially inner surface of said sheet and disposed in frictional engagement with the cylindrical surface of said inner member and said friction material is bonded to the radially outer surface of said sheet and is disposed in frictional engagement with the cylindrical surface of said outer member.

5. The combination with spaced apart inner and outer relatively rotatable members provided with opposed cylindrical surfaces concentric with the axis of rotation of said members and providing an annular space therebetween, of a yieldable connection between said rotatable members disposed within said annular space and comprising a separate preformed composite insert including a relatively thin substantially annular metal sheet within said annular space between and concentric with said cylindrical surfaces, a circumferentially extending row of circumferentially spaced individual slabs of elastic material bonded permanently in surface-to-surface relation to one of the radially facing surfaces of said sheet and disposed in surface-to-surface frictional engagement with the cylindrical surface of one of said rotatable members, and friction material bonded permanently in surface-to-surface relation to the other of the radially facing surfaces of said sheet and disposed in surface-to-surface frictional engagement with the cylindrical surface of the other of said rotatable members, the radial width of the annular space aforesaid being less than the initial combined overall cross-sectional thickness of said sheet and the material bonded to opposite surfaces thereof in the free state of said material, whereby said entire insert is under compression between said cylindrical surfaces, said slabs having a substantially constant torsion rate throughout a specified angle so that relative rotation of said members is substantially proportional to the torque applied, said slabs being so spaced as to close up when said specified angle is exceeded to substantially increase the torsion rate.

6. A torsional shaft comprising spaced apart inner and outer relatively rotatable members provided with opposed cylindrical surfaces concentric with the axis of rotation of said members and providing an annular space therebetween, a yieldable connection between said rotatable members disposed within said annular space and comprising a separate preformed composite insert including a relatively thin substantially annular metal sheet within said annular space between and concentric with said cylindrical surfaces, a plurality of axially spaced circumferentially extending rows of circumferentially spaced individual slabs of elastic material bonded permanently in surface-to-surface relation to one of the radially facing surfaces of said sheet and disposed in surface-to-surface frictional engagement with the cylindrical surface of one of said rotatable members, and friction material bonded permanently in surface-to-surface relation to the other of the radially facing surfaces of said sheet and disposed in surface-to-surface frictional engagement with the cylindrical surface of the other of said rotatable members, the radial width of the annular space aforesaid being less than the initial combined overall cross-sectional thickness of said sheet and the material bonded to opposite surfaces thereof in the free state of said material, whereby said entire insert is under compression between said cylindrical surfaces.

7. The torsional shaft defined in claim 6, wherein said slabs are relatively thick and capable of substantial radial compression and said friction material is a layer of elastic, relatively thin in comparison with said slabs, and substantially completely covering the surface of said sheet to which it is bonded.

8. The torsional shaft defined in claim 7, wherein said slabs have a substantially constant torsion rate throughout a specified angle so that relative rotation of said members is substantially proportional to the torque applied, and wherein said slabs are so spaced as to close up when said specified angle is exceeded to substantially increase the torsion rate.

9. The combination defined in claim 7, wherein said slabs are bonded to the radially inner surface of said sheet and disposed in frictional engagement with the cylindrical surface of said inner member and said friction material is bonded to the radially outer surface of said sheet and is disposed in frictional engagement with the cylindrical surface of said outer member.

10. A torsional shaft comprising spaced apart inner and outer relatively rotatable members provided with opposed cylindrical surfaces concentric with the axis of rotation of said members and providing an annular space therebetween, a yieldable connection between said rotatable members disposed within said annular space and comprising a separate preformed composite insert including a relatively thin, substantially annular metal sheet within said annular space between and concentric with said cylindrical surfaces, a plurality of axially spaced rows of circumferentially extending continuous strips of elastic material bonded permanently in surface-to-surface relation to one of the radially facing surfaces of said sheet and disposed in surface-to-surface frictional engagement with the cylindrical surface of one of said rotatable members, and friction material bonded permanently in surface-to-surface relation to the other of the radially facing surfaces of said sheet and disposed in surface-to-surface frictional engagement with the cylindrical surface of the other of said rotatable members, the radial width of the annular space aforesaid being less than the initial combined overall cross-sectional thickness of said sheet and the material bonded to opposite surfaces thereof in the free state of said material, whereby said entire insert is under compression between said cylindrical surfaces.

11. The torsional shaft defined in claim 10, wherein said strips are relatively thick and capable of substantial radial compression and said friction material is a layer of elastic, relatively thin in comparison with said strips, and substantially completely covers the surface of said sheet to which it is bonded.

12. The torsional shaft defined in claim 11, wherein said strips are bonded to the radially inner surface of said sheet and disposed in frictional engagement with the cylindrical surface of said inner member and said layer of elastic is bonded to the radially outer surface of said sheet and disposed in frictional engagement with the cylindrical surface of said outer member.

References Cited in the file of this patent

UNITED STATES PATENTS

| | | |
|---|---|---|
| 2,044,392 | Lord | June 16, 1936 |
| 2,468,985 | Krotz | May 3, 1949 |

FOREIGN PATENTS

| | | |
|---|---|---|
| 518,096 | Great Britain | Feb. 16, 1940 |